United States Patent Office 3,705,859
Patented Dec. 12, 1972

3,705,859
METHOD OF ABATING FOAM FORMATION IN AQUEOUS SYSTEMS
Francis J. Boylan, Wilmington, Del., assignor to Hercules Incorporated, Wilmington, Del.
No Drawing. Continuation-in-part of application Ser. No. 746,771, July 23, 1968, which is a continuation-in-part of application Ser. No. 667,376, Sept. 13, 1967, both now abandoned. This application Dec. 30, 1970, Ser. No. 102,954
Int. Cl. B01d 17/00
U.S. Cl. 252—321          10 Claims

ABSTRACT OF THE DISCLOSURE

Foam formation in aqueous systems is abated by adding thereto a foam abating amount of a stable dispersion comprised of finely divided particles of a normally solid hydrophobic synthetic polymer as the dispersed phase and a liquid organic non-solvent diluent as the continuous phase.

---

This application is a continuation-in-part of application Ser. No. 746,771, filed July 23, 1968 which in turn is a continuation-in-part of application Ser. No. 667,376, filed Sept. 13, 1967, both now abandoned.

This invention relates to a method of controlling foam in fluid systems that have a tendency toward foam formation, particularly when agitated.

Formation of foam is a problem that has plagued, and continues to plague, many industries. Thus, in the manufacture of paper, undesirable foam will usually form wherever paper stock is agitated. Substantial foam formation usually takes place at the screens and on the papermaking machine. The presence of foam in screening operations lowers screening efficiency and causes acceptable fibers to be lost in tailings. If a cylinder paper machine is employed in papermaking, foam forms in the vats thereof causing formation of uneven paper sheeting and loss of fibrous material owing to the overflow of foam from the vats.

The art is replete with methods of preventing, or at least abating, the formation of foam and of destroying existing foam. This invention is directed to a new and inexpensive method for controlling foam in fluid systems that have a tendency toward foam formation, and particularly in aqueous systems.

In accordance with this invention, there is provided a method for controlling foam in aqueous systems that have foam forming tendencies, which method comprises adding to the aqueous system a foam-controlling amount of a substantially stable dispersion comprised of (A) a normally solid hydrophobic synthetic polymer in finely divided form as the dispersed phase and (B) a liquid organic diluent as the continuous phase, the organic diluent being a nonsolvent for the particular hydrophobic synthetic polymer.

The dispersed phase (A) is comprised of at least one hydrophobic synthetic polymer in finely divided form. Thermoplastic synthetic polymers that are hydrophobic, that is, they are not readily wet by water, and are normally solid at room temperature (about 23° C.) are particularly suitable for use in this invention.

A normally solid, poly-α-olefin polymer is particularly suitable for use as the dispersed phase (A). A poly-α-olefin polymer is a polymer derived from an α-monoolefinic hydrocarbon having 2–20 carbon atoms. The normally solid homopolymers of α-monoolefinic hydrocarbons having 2–20 carbon atoms are such a polymer. The normally solid copolymers (which include graft polymers, addition polymers, block polymers and the like) of α-monoolefinic hydrocarbons having 2–20 carbon atoms with these α-monoolefinic hydrocarbons as well as with other unsaturated hydrocarbons such as butadiene are such a polymer. Examples of a normally solid polymer derived from an α-monoolefinic hydrocarbon having 2–20 carbon atoms are the linear and branched, low density and high density, crystalline and amorphous, normally solid homopolymers and copolymers of ethylene, propylene, butene-1, isobutylene, pentene-1, 2-methylbutene-1, 3-methylbutene-1, hexene-1, heptene-1, octene-1, nonene-1, decene-1, 4-methylpentene-1, 4-methylhexene-1, 5-ethylhexene-1, 6-methylheptene-1, 6-ethylheptene-1, styrene, allyl benzene, dodecene-1, tetradecene-1, hexadecene-1, octadecene-1, eicosene-1.

Other suitable polymers include the thermoplastic polyesters, such as polyethylene terephthalate; the nylons, such as nylon 6, nylon 6/6, and nylon 6/10; polybutadiene; and polyisoprene.

The hydrophobic synthetic polymer is employed in the form of finely divided particles of an average primary particle size within the range of from about 0.02 micron to about 50 microns. Preferred particle size will be in the range of from about 0.2 micron to 5 microns.

The liquid organic diluent (B) employed is a nonsolvent for the olefin polymer employed and is immiscible with water. Polar and nonpolar organic liquid diluents can be employed.

Examples of nonpolar organic liquids include saturated and unsaturated aliphatic hydrocarbons (straight chain and branched); saturated and unsaturated cycloaliphatic hydrocarbons; and aromatic hydrocarbons. Specific examples of the above hydrocarbons include hexane; heptane; octane; nonane; decane; 3-ethyl-2,3-dimethylhexane; 2-methylheptane; 2-methylhexane; 2-methylnonane; 1-hexene; 2-hexene; 1-heptene; 2-heptene; 2-methyl-1-pentene; cyclopentane; cyclohexane; cycloheptane; cyclohexene; methylcyclohexane; benzene; toluene; and xylene. Mixtures of two or more hydrocarbons can be used if desired. Thus, kerosene, a mixture of hydrocarbons, chiefly of the methane series having from 10 to 16 carbon atoms per molecule, and having a boiling range of from about 150–300° C., can be used.

Organic water-immiscible polar diluents include certain alcohols such as n-octyl alcohol, n-nonyl alcohol, and n-decyl alcohol; certain esters such as n-butyl propionate, diglycol laurate, n-butyl n-butyrate, t-butyl acetate, and propyl isovalerate; certain ketones such as dipropyl ketone; certain chlorinated aromatic hydrocarbons such as monochlorobenzene, m-dichlorobenzene, and o-dichlorobenzene; certain ethers such as diphenyl ether; certain phosphates such as tri(2-ethylhexyl)phosphate, and trichloroethylphosphate; liquid condensation polymers of propylene oxide and glycerol; and fluorinated hydrocarbons. Mixtures of the above polar solvents can be used. Also mixtures of polar and nonpolar solvents can be used if desired.

The dispersions used in this invention can be comprised of, by weight, from about 2% to 25% of solid dispersed phase (A) and from about 98% to 75% of continuous phase (B). Preferred dispersions will be comprised of from about 5% to 15% of (A) and from about 95% to 85% of (B).

The property of the dispersions of this invention to spread at an air-water interface can be improved, if desired, by incorporating in the dispersions a relatively small amount of a surface active agent. Surface active agents are sometimes referred to in the art as "surfactants." Anionic surface active agents, cationic surface active agents, and nonionic surface active agents can be used. The surface active agent used will be at least partially soluble in the continuous phase (B) at a temperature of from about 23° C. to about 95° C. Mixtures of two or more surface active agents can be used if desired. Mixtures of cationic and anionic surface active agents are not recommended however, as they are usually incompatible with one another. Examples of suitable anionic surface active agents include alkali metal, ammonium, and amine soaps, the fatty acid portion of the soaps containing at least 16 carbon atoms; alkali metal salts of alkyl-aryl sulfonic acids; sodium dialkyl sulfo-succinate; sulfated or sulfonated oils, e.g., sulfated castor oil; sulfonated tallow; and alkali salts of short chain petroleum sulfonic acids.

Examples of suitable cationic surface active agents include salts of long chain primary, secondary, and tertiary amines, such as oleylamine acetate, cetylamine acetate, didodecylamine lactate, the acetate of aminoethyl-aminoethyl stearamide, dilauroyl triethylene tetramine diacetate - 1 - aminoethyl - 2 - heptadecenyl imidazoline acetate; and quaternary salts, such as cetylpyridinium bromide, hexadecyl ethyl morpholinium chloride, and diethyl didodecyl ammonium chloride.

Examples of suitable non-ionic surface active agents include silicone oils; condensation products of higher fatty alcohols with ethylene oxide, such as the reaction product of oleyl alcohol with 10 ethylene oxide units; condensation products of alkylphenols with ethylene oxide, such as the reaction product of isooctylphenol with 12 ethylene oxide units; condensation products of higher fatty acid amides with 5, or more, ethylene oxide units; polyethylene glycol esters of long chain fatty acids, such as tetraethylene glycol monopalmitate, hexaethyleneglycol monolaurate, nonaethyleneglycol monostearate, nonaethyleneglycol dioleate, tridecaethyleneglycol monoarachidate, tricosaethylene glycol monobehenate, tricosaethyleneglycol dibehenate, ethylene oxide condensation products of polyhydric alcohol partial higher fatty acid esters, and their inner anhydrides (mannitol-anhydride, called Mannitan, and sorbitol-anhydride, called Sorbitan), such as glycerol monopalmitate reacted with 10 molecules of ethylene oxide, pentaerythritol monoleate reacted with 12 molecules of ethylene oxide, sorbitan monostearate reacted with 10 to 15 molecules of ethylene oxide, mannitan monopalmitate reacted with 10 to 15 molecules of ethylene oxide; long chain polyglycols in which one hydroxyl group is esterified with a higher fatty acid and the other hydroxyl group is etherified with a low molecular alcohol, such as methoxypolyethylene glycol 550 monostearate (550 indicated the average molecular weight of the polyglycol ether).

The amount of surface active agent employed is that required to provide the desired improvement in the property of the dispersions to spread at an air-water interface and is within the skill of those versed in the art. Usually, amounts of from about 0.01% to about 5%, based on the weight of the dispersion, can be satisfactorily employed. Amounts up to about 10% and higher can be used if desired.

The following examples are illustrative of this invention. All parts and percentages are by weight unless otherwise specified.

EXAMPLE 1

A 0.01% solution of alkyl benzene sodium sulfonate, available commercially under the proprietary designation Ultrawet 30DS, in distilled water is prepared. About 100 milliliters of the solution is placed in a 500 milliliter Erlenmeyer flask. The flask and contents are shaken by hand vigorously for about 5 seconds and substantial foam forms in the flask. The foam rises about ¾ inch above the surface of the liquid in the flask.

EXAMPLE 2

Example 1 is repeated except that prior to shaking the flask, there is added to the solution contained therein one drop of a stable dispersion comprised of about 4.8% finely divided polypropylene as the dispersed phase and about 95.2% xylene as the continuous phase. The average particle size of the polypropylene particles is about 0.2–0.3 micron. There is no foam formation in the flask after vigorous shaking of the contents of the flask in a manner similar to that of Example 1.

EXAMPLE 3

A .07% solution of alkyl benzene sodium sulfonate (Ultrawet 30DS) in distilled water is prepared. About 200 parts of the solution is placed in a vessel and there is added thereto one drop of a stable dispersion comprised of about 10.9% polypropylene particles of an average particle size of about 0.2–0.3 micron as the dispersed phase and about 89.1% aromatic hydrocarbon mixture available commercially as Solvesso 150. The dispersion contains a relatively small amount of 2-ethylhexanol used to wash the polypropylene particles. The vessel with contents is shaken by hand vigorously for about 10 seconds. There was no substantial foam formation.

EXAMPLE 4

A stable dispersion comprised of about 13.8% polypropylene particles of an average particle size of 0.2–0.3 micron and about 86.2% white mineral oil (hydrocarbon mixture predominate in aliphatic hydrocarbons of the methane series) is prepared. To this dispersion there is added and thoroughly admixed about 2% sorbitan monooleate, based on the weight of the dispersion. The resulting composition is very effective in the abatement of foam in hot (about 90° C.) black pulp mill liquor and in room temperature (about 23° C.) aqueous solutions of alkyl benzene sodium sulfonate.

EXAMPLE 5

Example 4 is repeated using, instead of polypropylene particles, particles of a copolymer of propylene and ethylene with equally satisfactory results. The copolymer of propylene and ethylene contains about 25% ethylene.

EXAMPLE 6

A stable dispersion of 10% finely divided polyethylene terephthalate (average particle size from about 2–5 microns) and 90% white mineral oil is prepared. The resulting composition is effective in reducing substantially the foam formed in hot (about 80° C.) black pulp liquor.

EXAMPLE 7

A stable dispersion of 10% finely divided polyethylene (particle sizes range from about 8 microns to 30 microns, the average particle size being less than 20 microns) and 90% white mineral oil is prepared. The resulting composition is effective in reducing substantially the foam formed in hot (about 80° C.) black pulp liquor.

EXAMPLE 8

A stable dispersion of 9.4% finely divided polyethylene (average particle size from about 1 micron to 3 microns) and 90.6% heptane is prepared. The resulting composition is effective in reducing substantially the foam formed in hot (about 75° C.) black pulp liquor.

EXAMPLE 9

To the dispersion of Example 8 there is added about 1% by weight, based on the weight of the dispersion, of sorbitan monooleate. This composition is more effective than the Example 8 composition in reducing foam formed in hot (about 75° C.) black pulp liquor.

EXAMPLE 10

To the dispersion of Example 8 there are added about 1% by weight, based on the weight of the dispersion, of polyoxyethylene adduct of sorbitan monooleate (Tween 80) and about 1% by weight, based on the weight of the dispersion, of sorbitan monooleate. This composition is more effective than the Example 9 composition in reducing foam formed in hot (75° C.) black pulp liquor.

EXAMPLE 11

To the dispersion of Example 8 there is added about 1% by weight, based on the weight of the dispersion, of silicone oil. This composition is more effective than the Example 10 composition in reducing foam formed in hot (75° C.) black pulp liquor.

In carrying out the method of this invention a foam destroying or a foam preventing amount of the stable dispersion is used. Selection of the required amount for a given aqueous system is within the skill of those versed in the art. It has been determined that relatively small amounts, of the order of from about 0.003% to 1%, by weight based on the weight of the aqueous system to which it is added, of dispersion are usually adequate. Larger amounts of stable dispersion can be used if desired.

The method of this invention is directed particularly to abating foam formation in aqueous systems having foam forming tendencies which are essentially a non-solvent medium for the said normally solid hydrophobic thermoplastic synthetic polymer. Thus, to function in accordance with this invention the finely divided normally solid hydrophobic polymers of which the dispersion are comprised must remain solid in the aqueous system being defoamed and not dissolve therein.

It is to be understood that the above description and working examples are illustrative of the invention and not in limitation thereof.

What I claim and desire to protect by Letters Patent is:

1. A method of abating foam formation in an aqueous system having foam forming tendencies which comprises adding to the aqueous system a foam abating amount of a dispersion consisting essentially of, by weight, (A) from about 2% to about 25% of at least one normally solid hydrophobic thermoplastic synthetic polymer in finely divided form as the dispersed phase, said thermoplastic polymer being selected from the group consisting of poly-α-olefin polymer, polyester, nylon, polybutadiene, and polyisoprene and, as the continuous phase, (B) from about 98% to about 75% of a water-immiscible organic liquid selected from the group consisting of a nonpolar organic liquid that is a non-solvent for the thermoplastic polymer, a polar organic liquid that is a non-solvent for the thermoplastic polymer, and mixtures thereof, said aqueous system having foam forming tendencies being essentially a non-solvent medium for the said normally solid hydrophobic thermoplastic synthetic polymer.

2. The method of claim 1 wherein the stable dispersion consists essentially of, by weight, from about 5% to about 15% of (A) and from about 95% to about 85% of (B).

3. The method of claim 1 wherein component (A) of the stable dispersion is a poly-α-olefin polymer.

4. The method of claim 1 wherein component (A) of the stable dispersion is ethylene homopolymer.

5. The method of claim 1 wherein component (A) of the stable dispersion is propylene homopolymer.

6. The method of claim 1 wherein component (A) of the stable dispersion is a copolymer of propylene and ethylene.

7. The method of claim 1 wherein component (A) of the stable dispersion is polyethylene terephthalate.

8. The method of claim 1 wherein component (A) of the stable dispersion is nylon.

9. The method of claim 1 wherein component (A) of the stable dispersion is polystyrene.

10. The method of claim 1 wherein the stable dispersion contains a surface-active agent, said surface-active agent being at least partially soluble in the continuous phase of the dispersion.

References Cited
UNITED STATES PATENTS

| | | | |
|---|---|---|---|
| 2,440,489 | 4/1948 | Rosen | 252—321 |
| 2,612,478 | 9/1952 | Gunderson | 252—321 |
| 2,820,699 | 1/1958 | Morris | 252—321 |
| 3,388,072 | 6/1968 | Domba | 252—321 |

JOHN D. WELSH, Primary Examiner

U.S. Cl. X.R.

252—358